United States Patent
Sogou et al.

(10) Patent No.: US 9,170,576 B2
(45) Date of Patent: Oct. 27, 2015

(54) ENERGY CONSERVATION DIAGNOSIS SYSTEM

(75) Inventors: Tomoya Sogou, Osaka (JP); Misayo Kobayashi, Osaka (JP); Yoshifumi Murakami, Osaka (JP); Hiroki Kazuno, Osaka (JP); Hisashi Takayama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 735 days.

(21) Appl. No.: 13/518,137

(22) PCT Filed: Dec. 17, 2010

(86) PCT No.: PCT/JP2010/072750
§ 371 (c)(1),
(2), (4) Date: Jul. 31, 2012

(87) PCT Pub. No.: WO2011/078075
PCT Pub. Date: Jun. 30, 2011

(65) Prior Publication Data
US 2012/0290231 A1 Nov. 15, 2012

(30) Foreign Application Priority Data
Dec. 21, 2009 (JP) ................................. 2009-289704

(51) Int. Cl.
*G06F 19/00* (2011.01)
*G06F 1/28* (2006.01)
(Continued)

(52) U.S. Cl.
CPC ................ *G05B 15/02* (2013.01); *G06Q 10/06* (2013.01); *G06Q 50/06* (2013.01); *G05B 2219/2642* (2013.01)

(58) Field of Classification Search
CPC ........... G05B 15/02; G05B 2219/2642; G05B 13/02; G06Q 10/06; G06Q 50/06
USPC ........................ 702/61, 177; 700/291; 236/47
See application file for complete search history.

(56) References Cited

U.S. PATENT DOCUMENTS 5,344,068 A * 9/1994 Haessig .......................... 236/47
2005/0096797 A1 5/2005 Matsubara et al.
(Continued)

FOREIGN PATENT DOCUMENTS

JP 08-256385 A 10/1996
JP 2001-065959 A 3/2001
(Continued)

OTHER PUBLICATIONS

International Search Report for corresponding International Application No. PCT/JP2010/072750 mailed Mar. 22, 2011.
(Continued)

*Primary Examiner* — John H Le
(74) *Attorney, Agent, or Firm* — Renner, Otto, Boisselle & Sklar, LLP (57) ABSTRACT

An energy conservation diagnosis system manages electrical device K which consumes electricity to operate based on control schedule information, and includes acquiring unit 14a, rule information generation unit 14b, operating determination unit 14c and display unit 12. Acquiring unit acquires operating information obtained by relating an operating condition of electrical device to a clock time. Rule information generation unit generates rule information by relating a rule on use of electrical device to a clock time, based on one or more predetermined time slots depending on a benefit of electricity consumed by electrical device. Operating determination unit acquires control schedule information of electrical device, and generates an image data by superimposing acquired control schedule information and rule information onto operating information so that each clock time is fitted to a clock time of operating information. Display unit displays the image data.

9 Claims, 11 Drawing Sheets (51) Int. Cl.
*G05B 15/02* (2006.01)
*G06Q 10/06* (2012.01)
*G06Q 50/06* (2012.01)

(56) References Cited

U.S. PATENT DOCUMENTS

2011/0057044 A1 3/2011 Nishino et al.
2012/0277924 A1* 11/2012 Kobayashi et al. ........... 700/291

FOREIGN PATENT DOCUMENTS

| | | |
|---|---|---|
| JP | 2004-251509 A | 9/2004 |
| JP | 2005-158020 A | 6/2005 |
| JP | 2005-332272 A | 12/2005 |
| JP | 2007-108024 A | 4/2007 |
| JP | 2007-172406 A | 7/2007 |
| JP | 2009-003788 A | 1/2009 |
| JP | 2009-210253 A | 9/2009 |
| WO | 2009/151078 A1 | 12/2009 |

OTHER PUBLICATIONS

Form PCT/ISA/237 for corresponding International Application No. PCT/JP2010/072750 dated Mar. 22, 2011.

* cited by examiner

| AREA Z1 | K11 | K12 | K13 | ... | K15 |
|---|---|---|---|---|---|
| 0:10 | OFF | ON | OFF | ... | ON |
| 0:20 | OFF | ON | OFF | ... | ON |
| 0:30 | OFF | ON | OFF | ... | ON |
| ... | ... | ... | ... | ... | ... |
| 23:50 | ON | OFF | OFF | ... | ON |
| 24:00 | ON | OFF | OFF | ... | ON |

Fig. 5

| No. | TARGET DEVICE | METHOD OF OPERATION | OPERATION START TIME | OPERATION STOP TIME | DAYS OF WEEK FOR OPERATION | PARTICULAR DAYS |
|---|---|---|---|---|---|---|
| 1 | K11 | ON-OFF | 10:00 | 20:00 | SUN. MON. TUE. WED. THU. FRI. SAT. | xx/xx |
| 2 | K12 | ON | 18:00 | | SUN. SAT. | EVERY xxxDAY |
| 3 | K13 | OFF | 22:00 | | MON. TUE. WED. THU. FRI. | NOTHING |
| ... | ... | ... | ... | ... | ... | ... |
| 5 | K15 | ... | ... | ... | ... | ... |

Fig. 6

| K13 | DAYS OF WEEK | RANGE OF TIME SLOT | | STOP PROHIBITION SETTING FLAG |
|---|---|---|---|---|
| SETTING No.1 | SUN. MON. TUE. WED. THU. FRI. SAT. | 10:00 | ~ 10:00 | ON |
| SETTING No.2 | SUN. SAT. | 20:00 | ~ 10:00 | OFF |
| ... | ... | ... | ... | ... |
| SETTING No.N | | | | |

ENERGY CONSERVATION DIAGNOSIS SYSTEM

TECHNICAL FIELD

The invention relates generally to an energy conservation diagnosis system.

BACKGROUND ART

Various kinds of conventional energy conservation systems have been provided for collecting data related to used amount of electricity (used amount of a resource) from electrical devices (devices to be monitored) located in buildings and facilities, and determining whether or not the used amount of electricity was wasted based on an objective index, and making too sharp a distinction between wasteful consumption and necessary consumption (for instance, see Japanese Patent Application Laid-Open No. 2007-172406).

In the abovementioned conventional energy conservation system, "time slot that the use is allowed" is set as an objective index for determining whether or not the used amount of electricity is wasted. Then, the system asks a manager to be restrained in the use of devices to be monitored in time slots other than the "time slot that the use is allowed". However, the system does not attach importance to development (including making a new schedule and modifying a schedule) of a control schedule for the devices to be monitored by using the time slot to be set. Thus, such a control schedule is considered by a manager with specialized knowledge, and thereby final control schedule is determined.

That is, if a manager does not have sufficient specialized knowledge in energy conservation technology, it is difficult for him to develop a control schedule for devices to be monitored in order to conserve energy.

BRIEF SUMMARY OF THE INVENTION

It is an object of the present invention to provide an energy conservation diagnosis system, which can make it likely that it is easy for a manager to develop a control schedule for devices to be monitored in order to conserve energy, even if he does not have sufficient specialized knowledge.

An energy conservation diagnosis system of the present invention manages a device to be monitored, which consumes a resource to operate based on control schedule information. The energy conservation diagnosis system comprises an acquiring means, a rule information generation means, an operating determination means, and a display means. Said acquiring means acquires operating information obtained by means of relating an operating condition of said device to be monitored to a clock time. Said rule information generation means generates rule information by means of relating a rule on use of said device to be monitored to a clock time, based on one or more predetermined time slots depending on a benefit of the resource consumed by said device to be monitored. Said operating determination means acquires the control schedule information of said device to be monitored, and then generates an image data by means of superimposing the acquired control schedule information and the rule information onto the operating information so that each clock time is fitted to a clock time of the operating information. Said display means displays the image data.

In this configuration, when developing a control schedule for said device to be monitored (including making a new schedule and modifying a schedule), a manager can recognize actual performance information of a usage state of said device to be monitored along with information that the manager intends, such as the rule information generated by means of relating the rule on use to the clock time and the control schedule information, by looking at an actual performance of a usage state of said device to be monitored, the rule information generated by means of relating the rule on use to the clock time as an indication of energy conservation and the current control schedule information at the same time. That is, the energy conservation diagnosis system can make it likely that it is easy for a manager to develop a control schedule for devices to be monitored in order to conserve energy, even if the manager does not have sufficient specialized knowledge.

In one embodiment, the rule information includes information that use of said device to be monitored is allowed in a predetermined time slot.

In this configuration, a manager can recognize a time slot that use of said device to be monitored is allowed, along with an actual performance of a usage state of said device to be monitored and the current control schedule information through said display means. Thus, the manager can develop a control schedule more easily.

In one embodiment, the rule information includes information that deactivation of said device to be monitored is not allowed in a predetermined time slot.

In this configuration, a manager can recognize a time slot that deactivation of said device to be monitored is not allowed, along with an actual performance of a usage state of said device to be monitored and the current control schedule information through said display means. Thus, the manager can develop a control schedule more easily.

In one embodiment, the energy conservation diagnosis system further comprises a schedule development means developing the control schedule information, and a schedule determination means determining consistency between the developed control schedule information and the rule information. Said display means is configured to show a determination result of said schedule determination means.

In this configuration, a manager can develop a control schedule in line with a rule on use in each time slot, even if not having sufficient specialized knowledge.

In one embodiment, said schedule determination means generates a message for prompting adjustment so that the control schedule information is consistent with the rule information, when determining that the developed control schedule information is not consistent with the rule information. Said display means is configured to show the message generated by said schedule determination means.

In this configuration, a manager can recognize a control schedule is not consistent with a rule on use in each time slot through display of the message. Therefore, the energy conservation diagnosis system can support that an inexperienced manager develops a control schedule.

In one embodiment, the energy conservation diagnosis system further comprises a schedule determination means acquiring the control schedule information of said device to be monitored. Said schedule determination means determines consistency between the acquired control schedule information and the rule information. Said display means is configured to show a determination result of said schedule determination means.

In this configuration, the energy conservation diagnosis system can present, to a manager, problems of the current control schedule with respect to a new time slot to be set. Therefore, a manager can easily recognize control schedule information, which needs to be modified, even if not having sufficient specialized knowledge.

In one embodiment, the energy conservation diagnosis system further comprises a calculation means, and then when ranges of the one or more time slots are modified and rules on use of the time slots after the modification are applied to said device to be monitored, said calculation means calculates amount of the resource consumed by said device to be monitored. Said display means is configured to show a calculation result of said calculation means.

In this configuration, when a new time slot has been set, a manager can easily recognize increased amount or decreased amount of the current consumed resource. Thus, the energy conservation diagnosis system can provide auxiliary information to the manager upon follow-on development of the control schedule.

In one embodiment, said calculation means calculates electrical energy consumed by said device to be monitored, upon applying rules on use of the time slots after the modification to said device to be monitored, based on a rated electrical power of said device to be monitored.

In this configuration, an expected value of the consumed electrical energy is calculated by using the rated electrical power of said device to be monitored. Accordingly, the energy conservation diagnosis system can estimate the expected value of the consumed electrical energy with a certain level of accuracy without measurement of actual consumed electrical energy. As a result, estimation of the consumed electrical energy can be achieved with a simple configuration, when a new time slot has been set.

In one embodiment, said acquiring means acquires operating information obtained by means of relating a consumed electrical power of said device to be monitored to a clock time. Said calculation means calculates electrical energy consumed by said device to be monitored, upon applying rules on use of the time slots after the modification to said device to be monitored, based on the consumed electrical power of said device to be monitored that is acquired by said acquiring means.

In this configuration, an expected value of the consumed electrical energy is calculated by using actual consumed electrical energy of said device to be monitored. Accordingly, estimation of the consumed electrical energy can be achieved with high accuracy, when a new time slot has been set.

BRIEF DESCRIPTION OF THE DRAWINGS

Preferred embodiments of the invention will now be described in further details. Other features and advantages of the present invention will become better understood with regard to the following detailed description and accompanying drawings where.

DETAILED DESCRIPTION OF THE INVENTION

An energy conservation diagnosis system according to an embodiment of the present invention will be explained below referring to Figures.

(Embodiment)

An energy conservation diagnosis system according to the present embodiment manages electrical energy (used amount of a resource) that is used by an electrical device (a device to be monitored), such as lighting equipment, air-conditioning equipment or the like, which is located in for instance restaurants, as described below. However, a target managed by the energy conservation diagnosis system is not limited to electrical energy that is used by the electrical device located in restaurants and then may be electrical energy that is used by an electrical device located in buildings, such as supermarkets, business offices or the like. In addition, the energy conservation diagnosis system may monitor electrical energy used by an electrical device other than lighting equipment and air-conditioning equipment.

Figure 1:
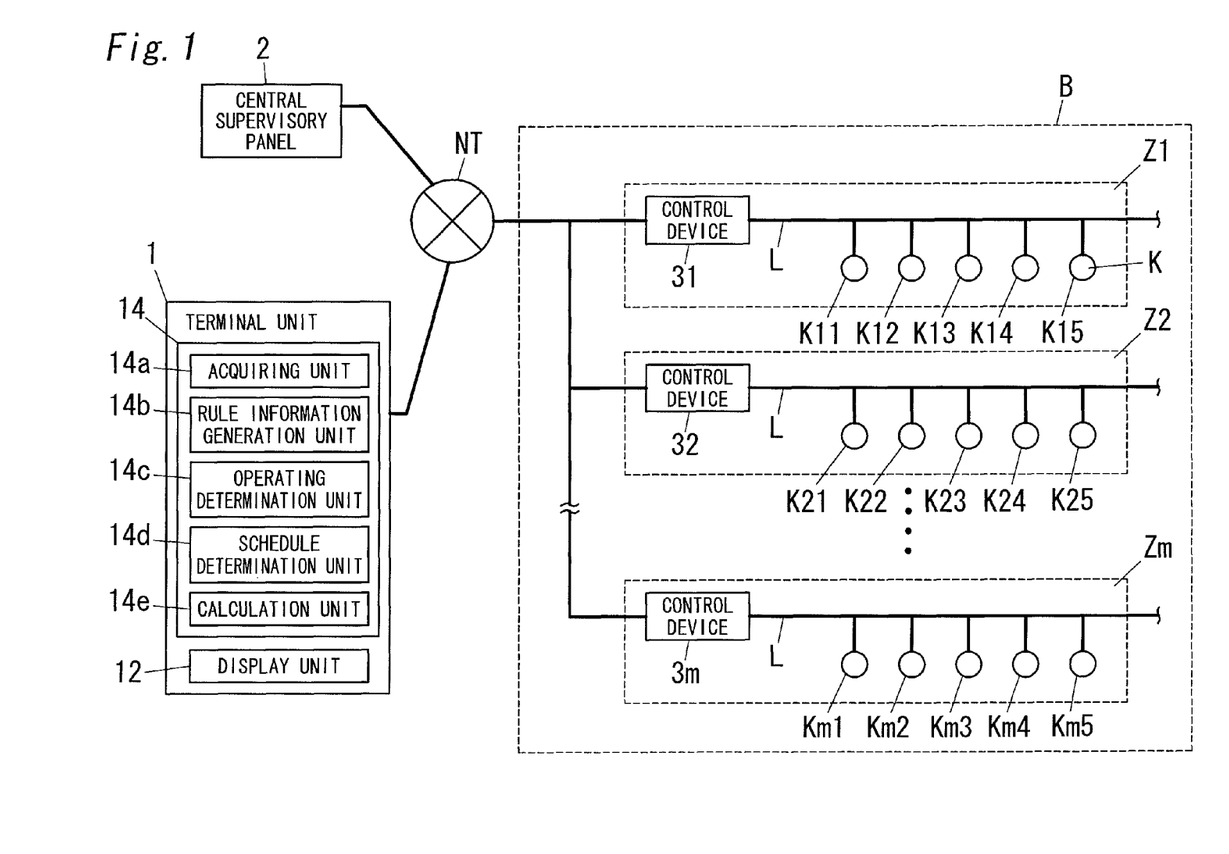
FIG. 1 is a schematic configuration diagram of an energy conservation diagnosis system according to an embodiment of the present invention.

FIG. 1 is a schematic configuration diagram showing the whole of the energy conservation diagnosis system. The system is used so as to manage operating conditions of electrical devices K11 to K15, K21 to K25, ..., Km1 to Km5, such as lighting equipment, air-conditioning equipment and the like, which are located within a store B, and a power manager performs energy conservation diagnosis through the system.

As shown in FIG. 1, the system comprises, as the main configuration, control devices 31, 32, ..., 3m that monitor and control operations of electrical devices K11 to K15, K21 to K25, ..., Km1 to Km5 located within store B, respectively, a central supervisory panel 2 that is connected to control devices 31, 32, ..., 3m via a communication network NT, such as Internet, a terminal unit 1 that is connected to central supervisory panel 2 via communication network NT. Then, a global IP address is set to each device connected to communication network NT, and each device has a function of communicating via communication network NT.

Here, the whole area in store B is divided into a plurality of areas Z1, Z2, ..., Zm. Then, control devices 31, 32, ..., 3m are located in the plurality of areas Z1, Z2, ..., Zm, respectively. Control devices 31, 32, ..., 3m are connected, through transmission lines L, to electrical devices K11 to K15, K21 to K25, ..., Km1 to Km5, respectively. For instance, as shown in FIG. 1, control device 31 is connected to five electrical devices K11 to K15. In the present embodiment, five electrical devices are located in one area. As a matter of course, the number of electrical devices located in one area is not limited to five, and may be for instance one.

In the following explanation, when it is described "area Zn", "electrical devices Kn1 to Kn5" and "control device 3n", the "n" denotes any one of "1" to "m". Then, when it is described "electrical device K", it denotes any one of electrical devices Kn1 to Kn5.

Then, individual address information is allocated to each of electrical devices K11 to K15, K21 to K25, ..., Km1 to Km5. Control device 3n can transmit/receive a transmission signal to/from five electrical devices Kn1 to Kn5 under itself by means of transmitting a transmission signal including address information into transmission line L. Here, control device 3n comprises a memory unit (not shown) in which control schedule information, transmitted from terminal unit 1 or central supervisory panel 2, is stored. Then, an operation start time to start operations of electrical devices Kn1 to Kn5 in area Zn individually, and an operation stop time to deactivate the devices Kn1 to Kn5 are registered with the control schedule information, for instance, for each day of a week. When the operation start time fixed in the control schedule information comes, control device 3n transmits an operation start signal to the corresponding electrical device K in electrical devices Kn1 to Kn5, and thereby the corresponding electrical device K starts operation. Furthermore, when the operation stop time fixed in the control schedule information comes, control device 3n transmits an operation stop signal to the corresponding electrical device K in electrical devices Kn1 to Kn5, and thereby the corresponding electrical device K stops operation.

In addition, the operation start of electrical device K means lighting-up, if the device is lighting equipment, and means starting the operation for air conditioning, if the device is air-conditioning equipment. Then, the operation stop of electrical device K means lighting-down, if the device is lighting equipment, and means stopping the operation for air conditioning, if the device is air-conditioning equipment.

Control device 3n acquires operating information from electrical devices Kn1 to Kn5 under itself for each a predetermined measurement cycle, and stores the information in a built-in memory. The operating information is information obtained by means of relating operating conditions of electrical devices Kn1 to Kn5 in area Zn for each 10 minutes into clock times, respectively, and shows whether or not each of electrical devices Kn1 to Kn5 is operating. For instance, when electrical device K11 is operating, the operating condition of device K11 is expressed in "ON", and when device K11 is stopping, the operating condition of device K11 is expressed in "OFF".

Figure 3:
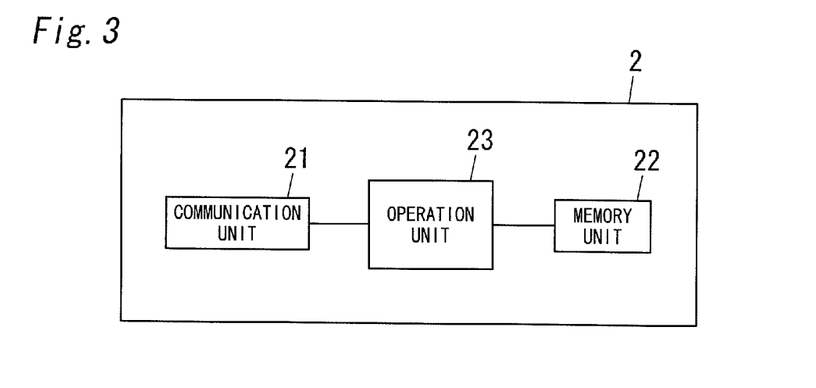
FIG. 3 is a block configuration diagram of a central supervisory panel according to said embodiment of the present invention.

Then, FIG. 3 is a block configuration diagram of central supervisory panel 2. Central supervisory panel 2 comprises, as the main configuration, a communication unit 21 for communicating via communication network NT, a memory unit 22 that stores the operating information acquired from control device 3n via communication unit 21, and an operation unit 23. Operation unit 23 causes communication unit 21 to transmit a data request signal into each of control device 3n every time a predetermined data collecting period passes. Then, when the operating information is returned by control device 3n in response to the data request signal, the operation unit 23 causes memory unit 22 to store the operating information received by communication unit 21.

Figure 4:
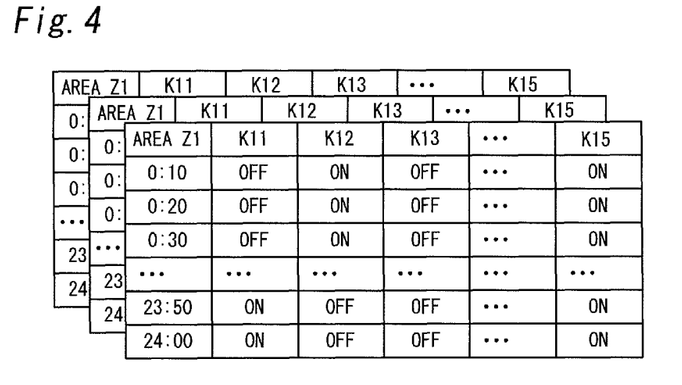
FIG. 4 is a table configuration diagram of operating information according to said embodiment of the present invention.

As shown in FIG. 4, the operating information stored in memory unit 22 is generated as a table, storing "ON" or "OFF" information, that shows operating conditions for a day of electrical devices Kn1 to Kn5. Here, three tables shown in FIG. 4 show three days' operating information of five electrical devices K11 to K15 located in area Z1. Then, such three days' operating information is generated for each area Zn. Each table stores "ON" or "OFF" information that shows operating conditions for each 10 minutes of electrical devices Kn1 to Kn5 in area Zn. Thus, the operating information expresses, by ON/OFF, whether or not each of electrical devices Kn1 to Kn5 is operating.

Here, terminal unit 1 of the present system is provided with a program for producing an image data showing the above-mentioned operating information. Terminal unit 1 carries out the program, and thereby the system can display, via a screen, actual data for time course of the operating condition of intended electrical device K, from among electrical devices Kn1 to Kn5. That is, the system can visually provide the actual data of the operating condition.

Figure 2:
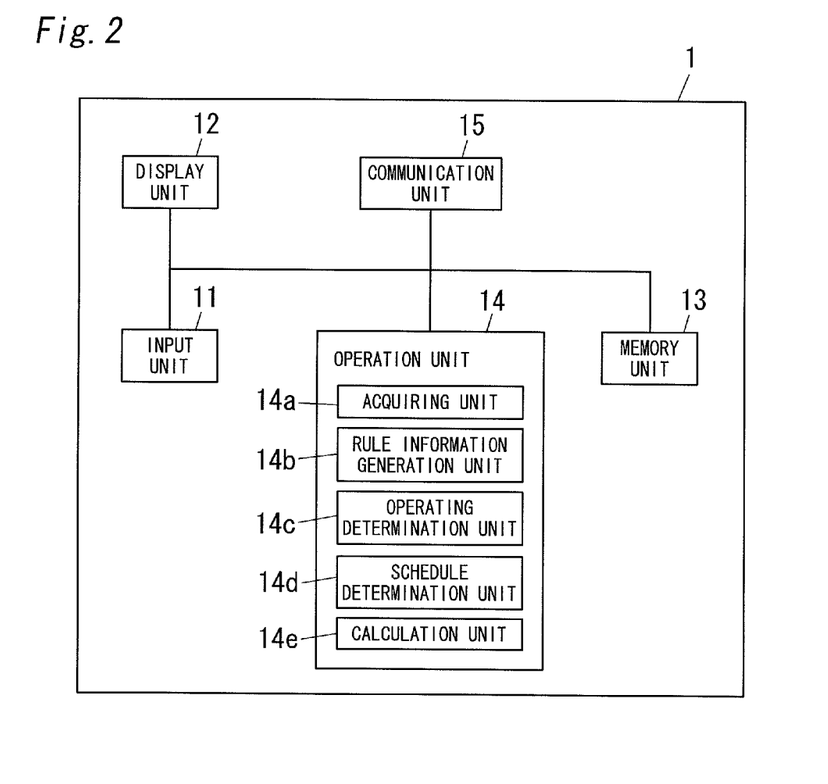
FIG. 2 is a block configuration diagram of a terminal unit in said energy conservation diagnosis system according to said embodiment of the present invention.

Terminal unit 1, as shown in the block diagram of FIG. 2, comprises an input unit 11, a display unit (display means) 12, a memory unit 13, an operation unit 14 and a communication unit 15. Input unit 11 is provided with a keyboard, a mouse, a touch panel or the like. Display unit 12 is provided with a display or the like, and its displayed contents is controlled by operation unit 14 described below. Memory unit 13 is provided with a large-capacity storage such as a hard disk, or a memory such as ROM or RAM, and stores the abovementioned program and the operating information and the like. Operation unit 14 carries out the program stored in memory unit 13. Communication unit 15 communicates via communication network NT.

Operation unit 14 functions, by carrying out the program stored in memory unit 13, as an acquiring unit (an acquiring means) 14a, a rule information generation unit (a rule information generation means) 14b, an operating determination unit (an operating determination means) 14c, a schedule determination unit (a schedule determination means) 14d, and a calculation unit (a calculation means) 14e.

Figure 5:
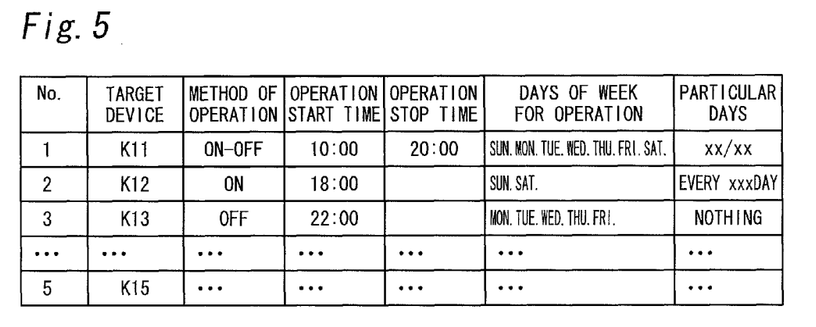
FIG. 5 is a table configuration diagram of control schedule information according to said embodiment of the present invention.

In the abovementioned system, electrical devices K11 to K15, K21 to K25, ..., Km1 to Km5 operate based on a predetermined control schedule information. For instance, electrical device K, having started the operation, consumes the power supplied by electrical power system such as a commercial power source not shown. Meanwhile, power consumption of electrical device K, having stopped the operation, becomes zero, or standby electricity is consumed. As shown in FIG. 5, control schedule information is generated, for each area, as a table in which various data is stored. Specifically, the various data includes a controlled target device (an electrical device K being subject to controlling), a method of operation (ON-OFF, ON, OFF or the like), an operation start time, an operation stop time, days of week for operation, and particular days (days when the controlled object device is operated, other than said days of week for operation). Then, FIG. 5 shows the control schedule information of only electrical devices K11 to K15 located in area Z1.

Furthermore, an operation switch (not shown) is located in area Zn, and carries out on/off operation or the like of five electrical devices Kn1 to Kn5 located in the area. When, for instance, an employed worker operates the corresponding operation switch to start or stop operation of electrical devices Kn1 to Kn5 located in intended area Zn, an operation signal is transmitted from the operation switch into control device 3n that manages the area Zn. At this time, control device 3n transmits a control signal into all of the corresponding five electrical devices Kn1 to Kn5 in response to the operation signal inputted from the operation switch, and thereby the five electrical devices Kn1 to Kn5 are changed from an operational state to a stopped state, or are changed from a stopped state to an operational state. Therefore, the employed worker can activate the five electrical devices Kn1 to Kn5 even in time slots other than a time slot designated by the control schedule information. Then, the abovementioned operation switch can change operating conditions of the five electrical devices Kn1 to Kn5 as a group. However, an operation switch that can change operating conditions thereof individually may be located.

The energy conservation diagnosis system of the present invention, in a control system used as described above, is used for energy conservation diagnosis designed to estimating whether or not the use of electricity for each time slot of an electrical device is beneficial, and designed to developing a control schedule in which consumed electrical energy can be reduced. The process that a power manager in store B performs energy conservation diagnosis by using terminal unit 1 will be explained below.

First, like the present system described above, when terminal unit 1 is connected to central supervisory unit 2 being subject to monitoring via communication network NT, acquiring unit 14a of operation unit 14 in terminal unit 1 automatically obtains, as operating information, a table from central supervisory unit 2 via communication unit 15, and then stores the table in memory unit 13. Then, the table includes "ON" or "OFF" information that denotes operating conditions for each 10 minutes of electrical devices Kn1 to Kn5 in area Zn, as shown in FIG. 4.

Figure 6:
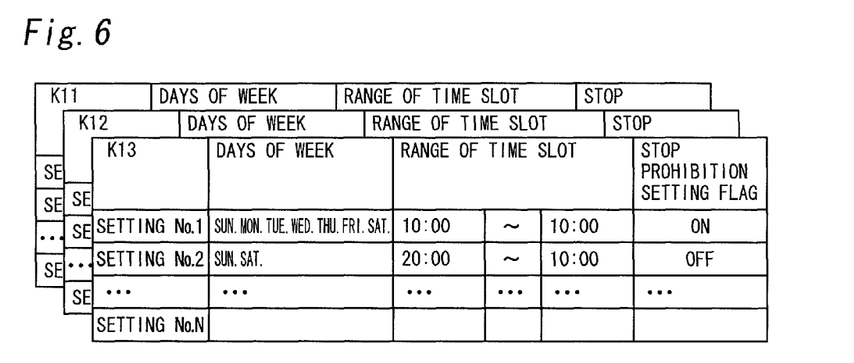
FIG. 6 is a table configuration diagram of time slot data to be set according to said embodiment of the present invention.

Rule information generation unit 14b of operation unit 14 generates rule information by means of relating a rule on use of an electrical device to a clock time. Here, as shown in FIG. 6, a time slot data is required to be set for each electrical device to generate the rule information, and the time slot data includes a setting number, days of week, a range of a time slot, and a stop prohibition setting flag (FIG. 6 shows only electrical devices K11 to K13). The power manager sets the abovementioned time slot data through input unit 11 with respect to each of electrical devices K11 to K15, K21 to K25, . . . , Km1 to Km5. That is, in the present embodiment, the power manager preliminarily sets days of week and a range of a time slot as considered that the use of electricity for operating electrical device K is beneficial. As a result, rule information generation unit 14b generates rule information by means of relating a rule on use of electrical device K denoting "use of electrical device K is allowed" or a rule on use of electrical device K denoting "deactivation of electrical device K is not allowed" to a clock time.

More specifically, for instance, the power manager sets, through input unit 11, days of week and a range of a time slot in which use of electrical device 13 is allowed, as "Setting No.1", with respect to electrical device K13. However, if the power manager sets "ON" with respect to the stop prohibition setting flag, the rule information generation unit 14b generates rule information that denotes "deactivation of electrical device K is not allowed" during the days of week and the range of the time slot (Hereinafter, called as a stop prohibition time slot T1a). In contrast, if the power manager sets "OFF" with respect to the stop prohibition setting flag, the rule information generation unit 14b generates rule information that denotes "use of electrical device K is allowed" during the days of week and the range of the time slot (Hereinafter, called as a usable time slot T1).

That is, the stop prohibition setting flag is a flag for determining whether or not the usable time slot T1 is set into the stop prohibition time slot T1a denoting that deactivation of electrical device K is not allowed and the device K is necessarily operated. Then, when desiring that the usable time slot T1 is set into the stop prohibition time slot T1a, the power manager sets the flag into ON. When desiring that the usable time slot T1 is not set into the stop prohibition time slot T1a, the power manager sets the flag into OFF.

Figure 7:
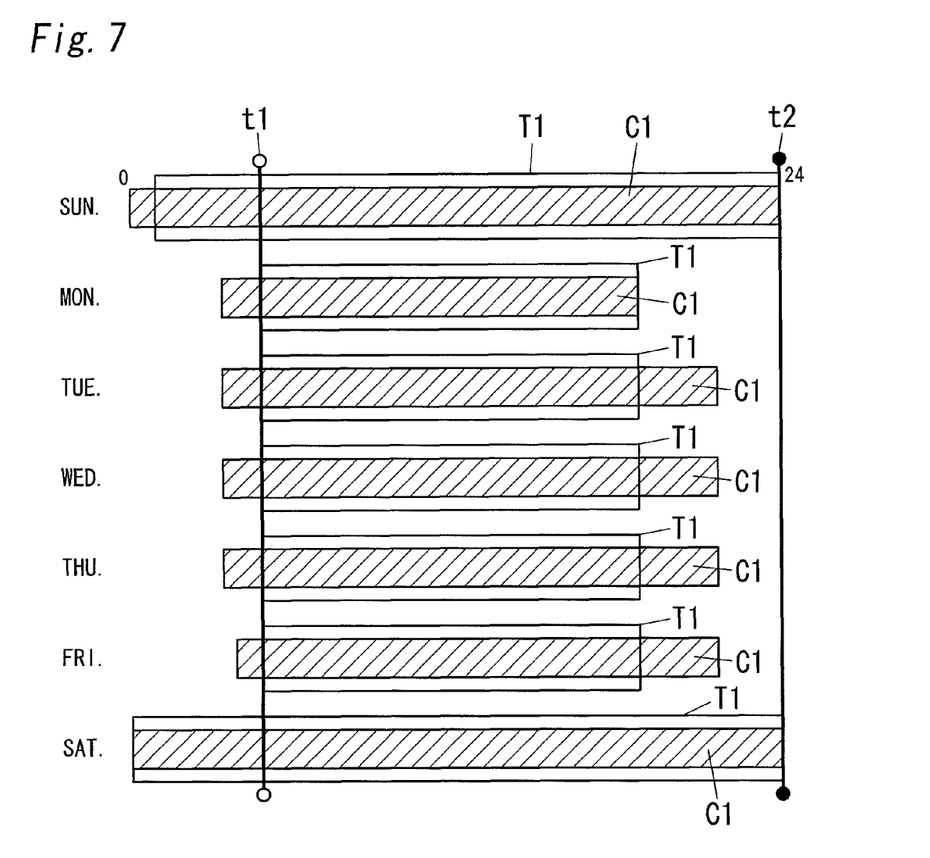
FIG. 7 is a diagram showing a display screen image of an operating condition of an electrical device according to said embodiment of the present invention.

Then, through the power manager's operation of input unit 11, operating determination unit 14c generates, as an image data, actual performance of operating condition of intended electrical device K over a predetermined period (for instance, latest one week), based on the operating information acquired by acquiring unit 14a. As shown in FIG. 7, in this image data, 0 a.m. to 24 p.m. in each day of the latest one week is divided into a plurality of cells for each unit time. When operating condition (See FIG. 4) of electrical device K for each unit time is in ON-state (operational state), the cells are displayed as a display cell C1. When the operating condition for each unit time is in OFF-state (stopped state), the cells are non-displayed. Then, a region of the display cell C1 denoting the ON-state is represented by rising diagonal strokes from bottom left to top right.

Then, operating determination unit 14c generates an image data by means of superimposing frames that denote time ranges of the usable time slot T1 and the stop prohibition time slot T1a in rule information of electrical device K onto the generated display of operating condition of electrical device K for each day of one week so that clock times thereof are fitted to a clock time of the generated display (See FIG. 7. However, FIG. 7 shows only the usable time slot T1). That is, the power manager can recognize, visually and easily, operating condition of electrical device K in each time slot of the rule information (including the usable time slot T1, the stop prohibition time slot T1a, and time slots other than the time slots T1, T1a).

Furthermore, operating determination unit 14c obtains the control schedule information of electrical device K from control device 3n, and then generates an image data by means of superimposing an operation start time t1 and an operation stop time t2 of electrical device K, that are set into the control schedule, onto the generated display of operating condition of the device K so that clock times thereof are fitted to a clock time of the generated display (See FIG. 7). That is, the power manager can recognize, visually and easily, time slots in which the operation start time t1 and the operation stop time t2 that have been set into the control schedule of electrical device K are located, respectively.

Then, display unit 12 shows, on a screen, the abovementioned image data generated by the operating determination unit 14c.

The power manager operates input unit 11, and thereby the image data (See FIG. 7) generated as explained above is shown on display unit 12. Then, the power manager can recognize actual performance of a week usage state of electrical device K along with the rule information (the usable time slot T1, the stop prohibition time slot T1a and the like), generated based on a predetermined time slot depending on a benefit of the power consumed by electrical device K, and the present control schedule of electrical device K. Accordingly, when the power manager develops a control schedule of electrical device K (including making a new schedule and modifying a schedule), actual performance of a week usage state of electrical device K, each time slot into which a rule on use is set for the purpose of energy conservation, and the present control schedule are shown at the same time. As a result, the power manager can recognize the actual performance of a week usage state of electrical device K, along with each time slot into which a rule on use is set and the present control schedule that are information including intent of the power manager. That is, through the present system, the power manager can develop a control schedule easily for the purpose of energy conservation, even if not having sufficient specialized knowledge.

When a power manager operates input unit 11 (a schedule developing means) and develops a control schedule of electrical device K for the purpose of energy conservation, the developed control schedule information is transmitted from communication unit 15 into control device 3n, and then the control schedule information stored in control device 3n is updated.

Next, operation of schedule determination unit 14d in operation unit 14 will be explained below. When the power manager develops the control schedule, schedule determination unit 14d determines consistency between the developed control schedule information and the rule information (the usable time slot T1, the stop prohibition time slot T1a and the like) before the developed control schedule information is transmitted from communication unit 15 into control device 3n, as explained above.

Figure 8:
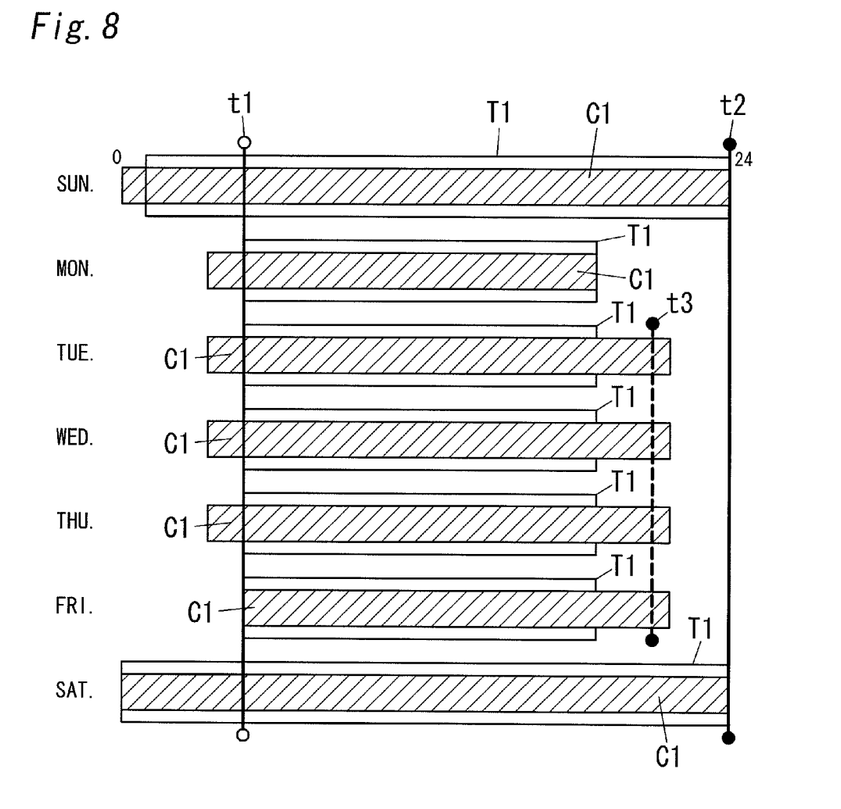
FIG. 8 is a diagram showing a display screen image in a case where a control schedule has been erroneously set according to said embodiment of the present invention.

For instance, when the control schedule is developed so that the operation start time is set outside the scope of the usable time slot T1 and the stop prohibition time slot T1a, schedule determination unit 14d determines that the developed control schedule is against rules on use of the usable time slot T1 and the stop prohibition time slot T1a. That is, schedule determination unit 14d determines that because electricity is consumed outside the scopes of the usable time slot T1 and the stop prohibition time slot T1a, it is a waste of electricity and thus the operation start time should be set inside the scope of the usable time slot T1 or the stop prohibition time slot T1a. So, as shown in FIG. 8, schedule determination unit 14d informs that the operation start time t3 is not consistent with the rule information by means of flashing, on a screen of display unit 12, the display of the operation start time t3 which has been set outside the scope of the usable time slot T1. The power manager notices that the flashing operation start time t3 is not consistent with the rule information, and thus the control schedule is properly redeveloped. Thus, the present system can prevent wasteful consumption of electricity, and then the power manager can easily enhance, through the present system, energy conservation, even if not having sufficient specialized knowledge.

Figure 9:
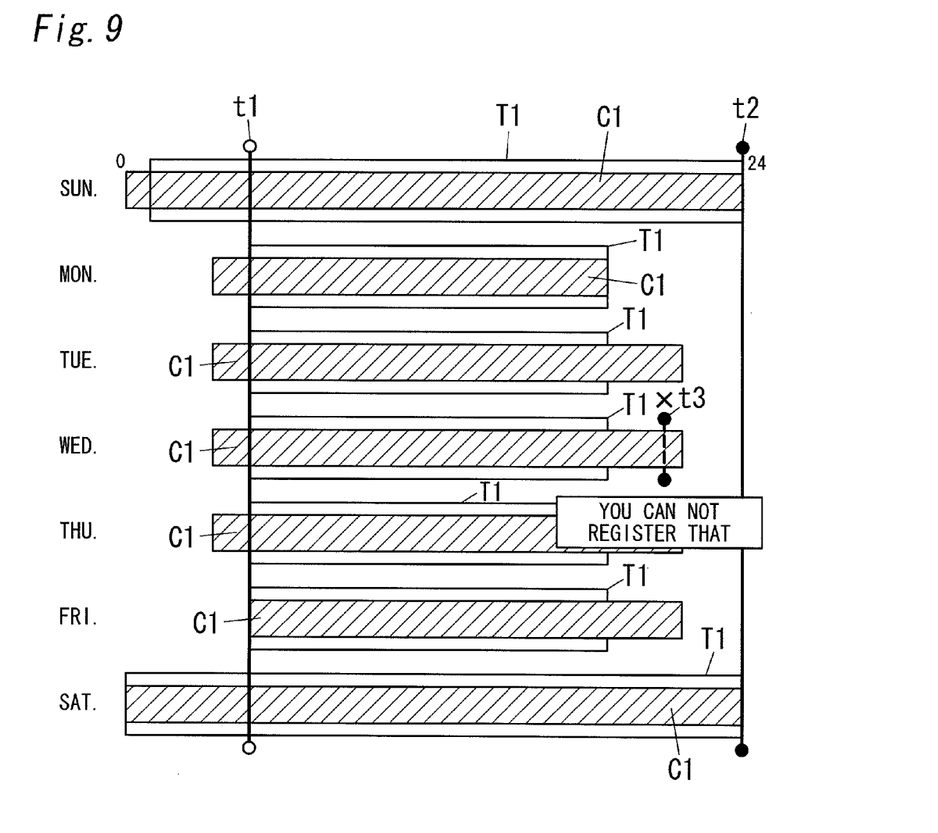
FIG. 9 is a diagram showing another display screen image in a case where a control schedule has been erroneously set according to said embodiment of the present invention.

Then, as shown in FIG. 9, schedule determination unit 14d may inform, on a screen of display unit 12, that the operation start time t3 is not consistent with the rule information, by means of displaying a message: "You can not register that" and an "x" mark, for the display of the operation start time t3 which has been set outside the scope of the usable time slot T1.

Figure 10:
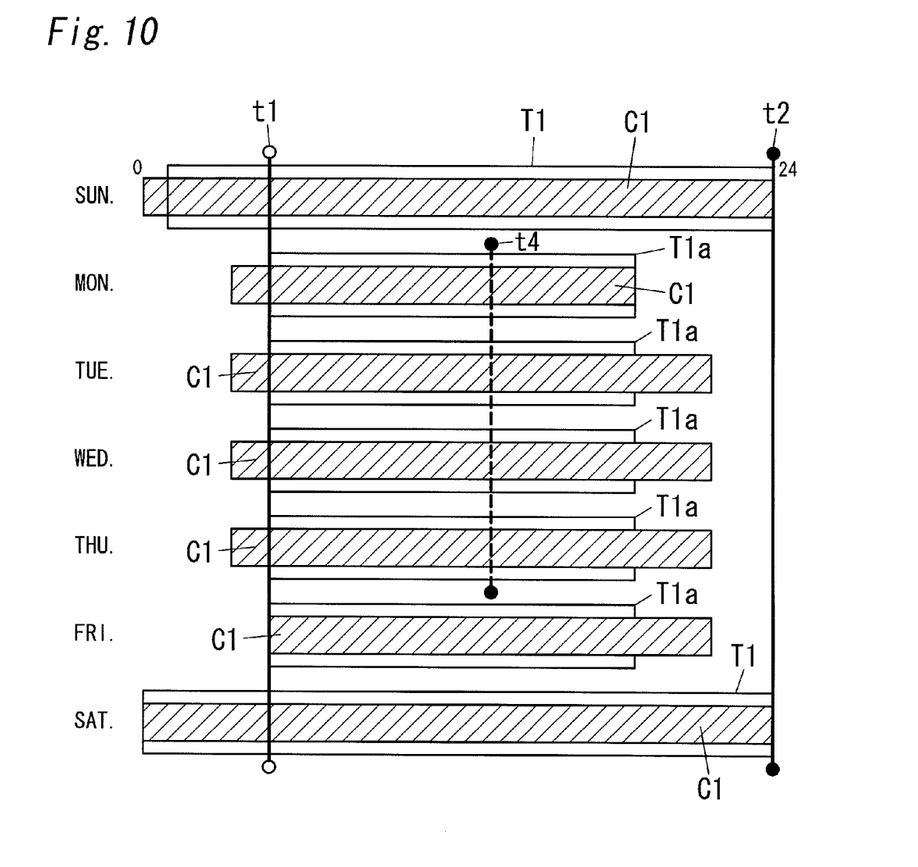
FIG. 10 is a diagram showing yet another display screen image in a case where a control schedule has been erroneously set according to said embodiment of the present invention.

Furthermore, for instance, when the control schedule is developed so that the operation stop time is set inside the scope of the stop prohibition time slot T1a, schedule determination unit 14d determines that deactivation of electrical device K inside the scope of the stop prohibition time slot T1a is against a rule on use of the stop prohibition time slot T1a and thus the operation stop time should be set outside the scope of the stop prohibition time slot T1a. So, as shown in FIG. 10, schedule determination unit 14d informs that the operation stop time t4 is not consistent with the rule information by means of flashing, on a screen of display unit 12, the display of the operation stop time t4 which has been set inside the scope of the stop prohibition time slot T1a. Therefore, the power manager notices that the flashing operation stop time t4 is not consistent with the rule information, and the control schedule is properly redeveloped. Thus, the present system can prevent incorrect setting of the control schedule, and then the power manager can develop a control schedule including appropriate operating contents, even if not having sufficient specialized knowledge.

As explained above, the present system is provided with schedule determination unit 14d, and thereby a power manager can develop a control schedule information along a rule on use of each time slot, even if not having sufficient specialized knowledge. In addition, the present system can support that an inexperienced power manager develops a control schedule by means of displaying a message that the control schedule is against a rule on use of each time slot (See FIGS. 9 and 11).

Figure 11:
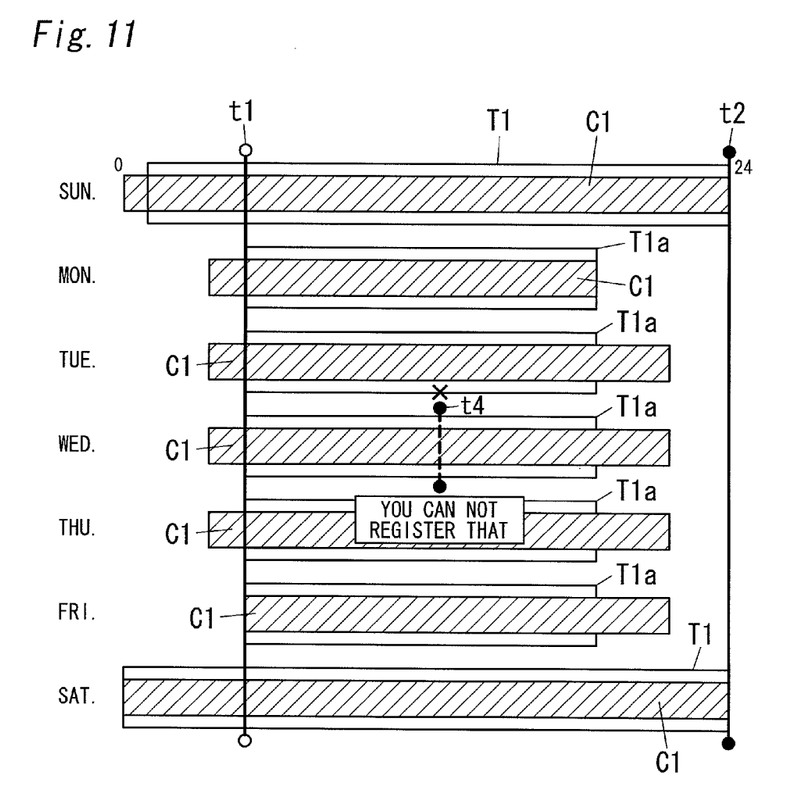
FIG. 11 is a diagram showing yet another display screen image in a case where a control schedule has been erroneously set according to said embodiment of the present invention.

Then, as shown in FIG. 11, schedule determination unit 14d may inform, on a screen of display unit 12, that the operation stop time t4 is not consistent with the rule information, by means of displaying a message: "You can not register that" and an "x" mark, for the display of the operation stop time t4 which has been set inside the scope of the stop prohibition time slot T1a.

In the abovementioned examples shown in FIGS. 8 to 11, schedule determination unit 14d determines whether or not the control schedule developed by the power manager through operating of input unit 11 (the schedule developing means) is consistent with the rule information that has already been generated by rule information generation unit 14b. However, schedule determination unit 14d can also obtain control schedule information of intended electrical device K from control device 3n, and can also determine consistency between the obtained control schedule information and the rule information of electrical device K, like the above. In this case, when a new usable time slot T1, a new stop prohibition time slot T1a and the like are set or a range of existing time slot is modified, the unit 14d can determine whether or not the modified time slot is consistent with the present control schedule that is being carried out in electrical device K.

That is, problems with the present control schedule can be presented to a power manager for a time slot newly set. Thus, the power manager can easily recognize control schedule information, which needs to be modified, even if not having sufficient specialized knowledge.

Next, operation of calculation unit 14e in operation unit 14 will be explained below. When the power manager modifies a range of the usable time slot T1, the stop prohibition time slot T1a or the like, calculation unit 14e calculates an expected value of consumed electrical energy depending on applying a rule on use of the time slot after modification to electrical device K.

Figure 12:
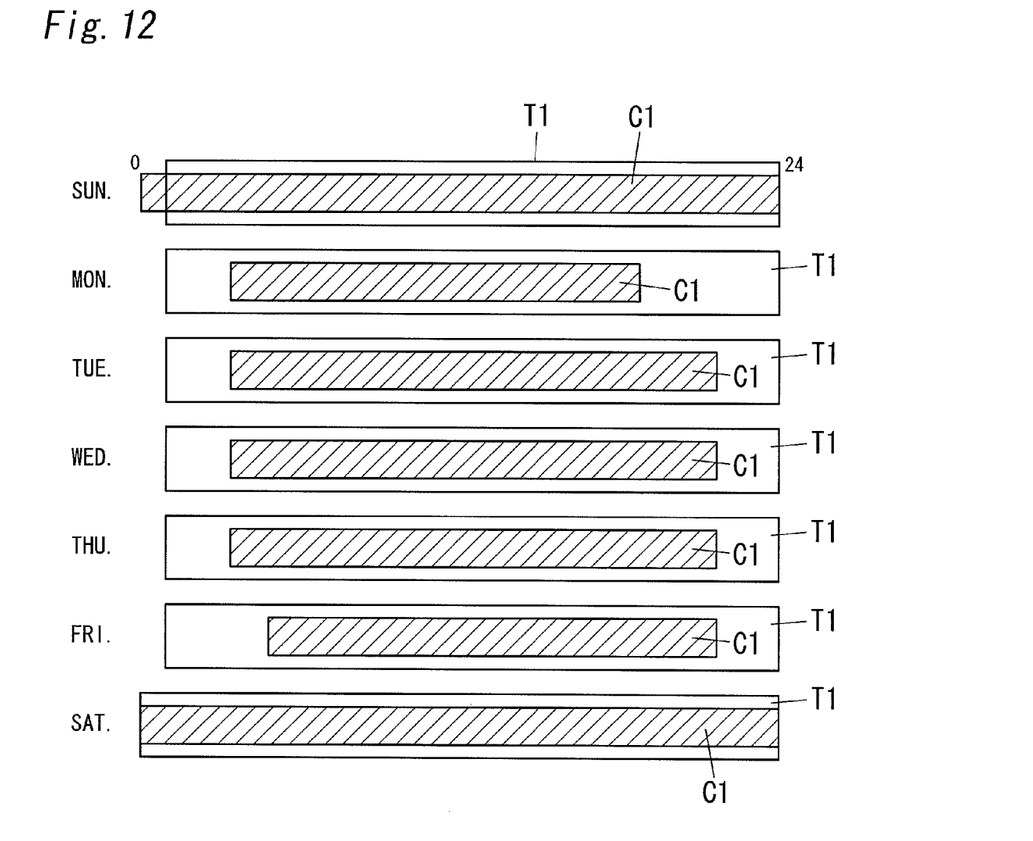
FIG. 12 is a diagram showing a display screen image in a case where a range of a time slot has been modified according to said embodiment of the present invention.
Figure 13:
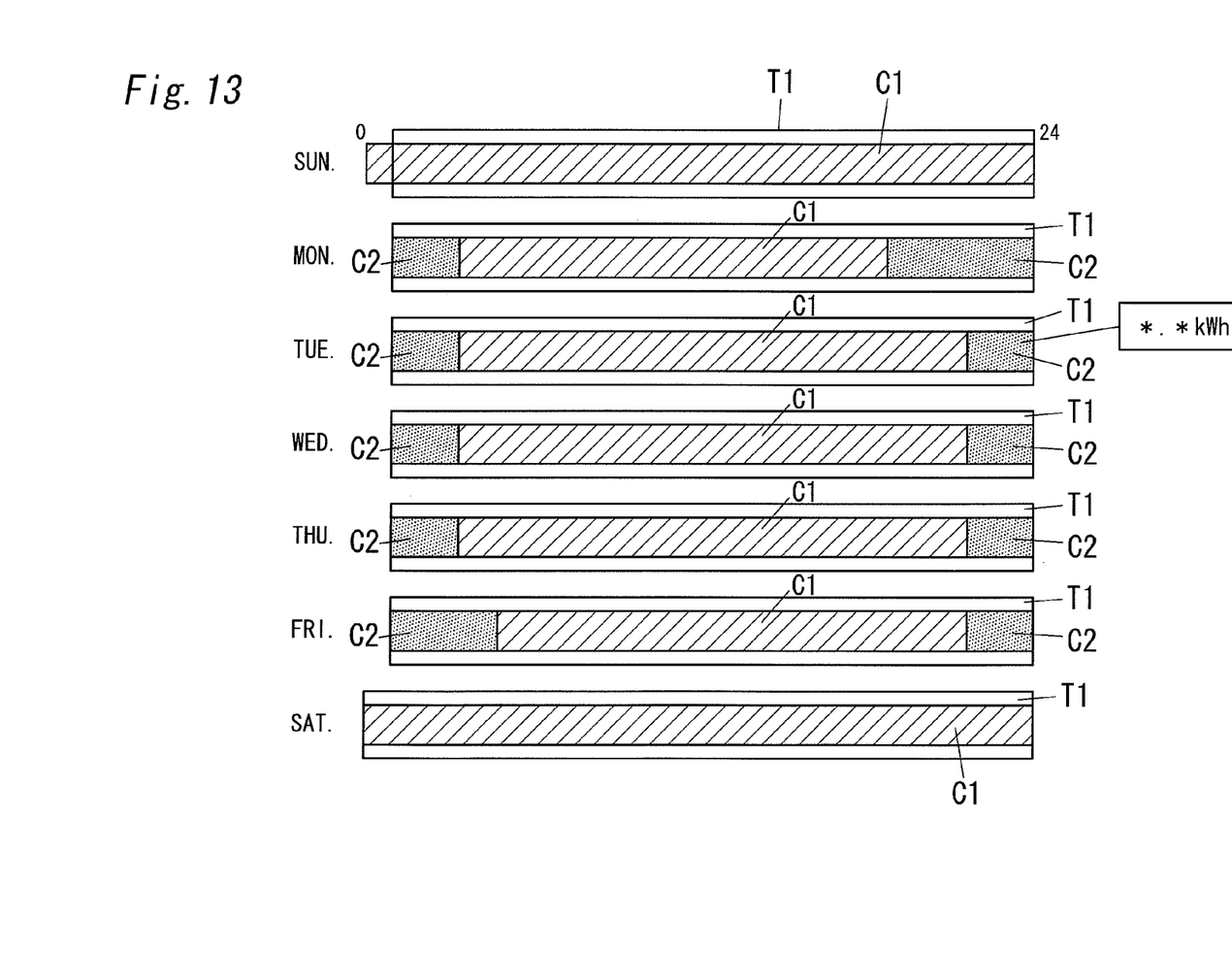
FIG. 13 is a diagram showing a display screen image in a case where a range of a time slot has been modified according to said embodiment of the present invention.

For instance, when the usable time slot T1, as shown in FIG. 12, is extended compared with the usable time slot T1 that has been set in FIG. 7, calculation unit 14e, as shown in FIG. 13, generates an image data so that a cell C2 corresponding to the extended part of the usable time slot T1 is shown in a color different from the display cell C1 denoting the ON-state. Display unit 12 shows the image data generated by calculation unit 14e on a screen. Then, a region of the cell C2 corresponding to the extended part of the usable time slot T1 is represented by a dot. The rule on use of the usable time slot T1 denoting "use of electrical device K is allowed" is applied in the region of the cell C2, and then electrical device K is used at a predetermined availability ratio (for instance, 80%).

Then, the power manager operates input unit 11, and thereby the generated image data (See FIG. 13) is shown on a screen of display unit 12. When the power manager selects a region of any one of cells C2, an expected value "*.* kWh" of consumed electrical energy in the selected cell C2 is shown on the screen of display unit 12. A rated electrical power of each electrical device K is preliminarily stored in calculation unit 14e, and then the expected value (an increase) of consumed electrical energy of electrical device K in the selected cell C2 is calculated by using the rated electrical power.

Also, when the usable time slot T1 is shortened, calculation unit 14e generates an image data so that a cell (not shown) corresponding to the shortened part of the usable time slot T1 is shown in a color different from the display cell C1 denoting the ON-state. Display unit 12 shows the image data generated by calculation unit 14e on a screen. Then, like the above, when the power manager operates input unit 11 and selects a region of any one of the cells, the present system can show the expected value (a decrease) of consumed electrical energy of electrical device K in the selected cell, on the screen of display unit 12. In this case, electrical device K is used at a predetermined availability ratio (for instance, 20%) in the cell corresponding to the shortened part of the usable time slot T1.

Accordingly, the present system calculates an expected value of consumed electrical energy by using a rated electrical power of each electrical device K, and thereby the present system can estimate the expected value of the consumed electrical energy with a certain level of accuracy without measurement of actual consumed electrical energy. Then, estimation of the consumed electrical energy can be achieved with a simple configuration, when a new time slot has been set.

Then, in the abovementioned examples, the operating information acquired by acquiring unit 14a in terminal unit 1 denotes whether or not each electrical device K is operating (that is, ON/OFF). However, actual consumed power of each electrical device K may be acquired as the operating information. In this case, a power meter (not shown) for measuring the actual consumed power of each electrical device K is located in the present system. The present system can determine whether or not each electrical device K is operating, by means of determining whether or not the actual consumed power of each electrical device K exceeds standby electricity in terminal unit 1.

Then, when the consumed power of each electrical device K is acquired as the operating information, calculation unit 14e in operation unit 14 calculates, as explained below, an expected value of consumed electrical energy by using a control schedule information that has been developed newly.

Figure 14:
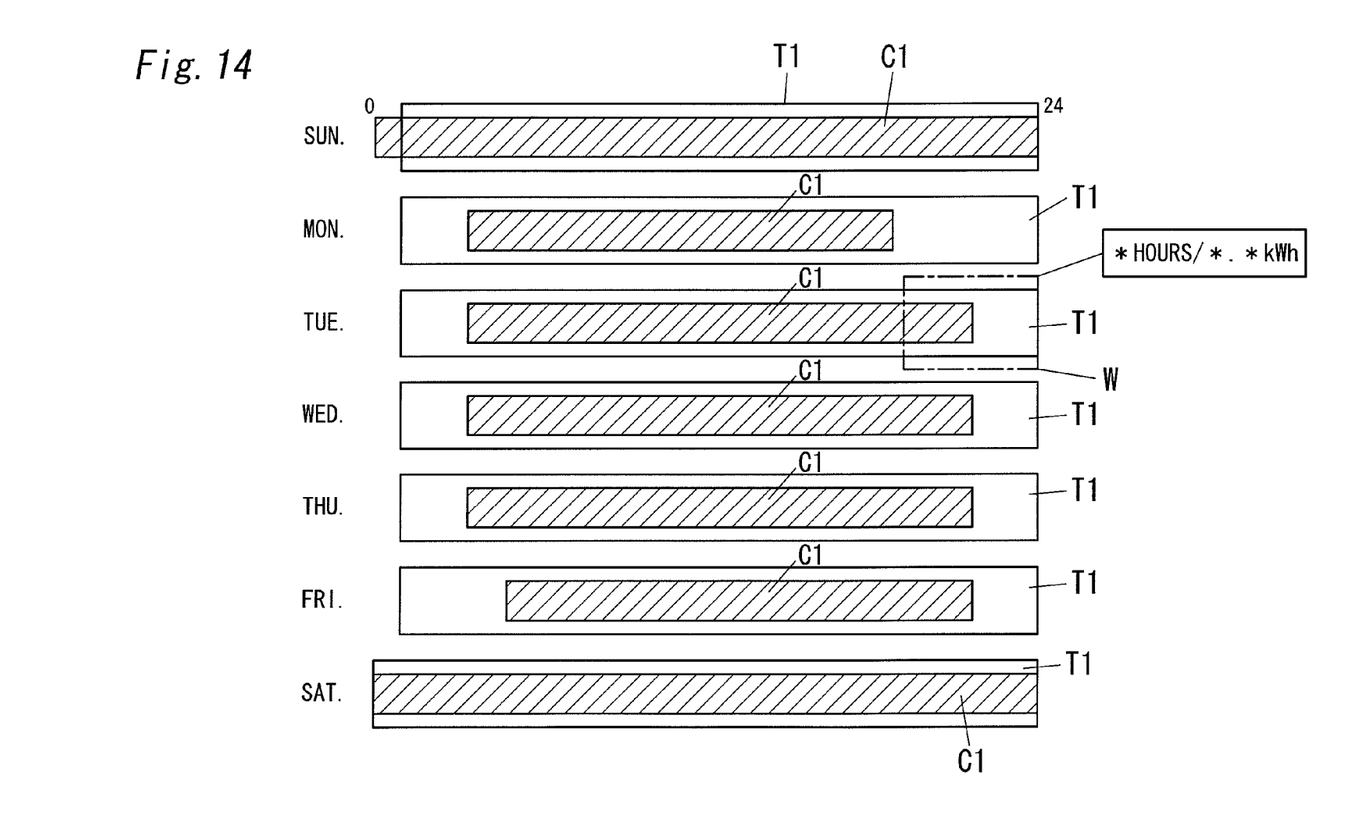
FIG. 14 is a diagram showing another display screen image in a case where a range of a time slot has been modified according to said embodiment of the present invention.

For instance, when a power manager, as shown in FIG. 12, extends the usable time slot T1 compared with the usable time slot T1 that has been set in FIG. 7, the image data, as shown in FIG. 14, can be shown on a screen of display unit 12 through the power manager's operation of input unit 11. Furthermore, if the power manager separates, with a frame W, an intended period in an expected value of consumed electrical energy through operation of input unit 11, calculation unit 14e applies a rule on use of the usable time slot T1 denoting "use of electrical device K is allowed" to the extended part of the usable time slot T1. And then, calculation unit 14e calculates an expected value of consumed electrical energy in the frame W based on actual values (history) of consumed electrical energy stored in memory unit 13. Then, the expected value "*.* kWh" of consumed electrical energy in the frame W is shown on a screen of display unit 12 together with a range "* hours" of the frame W.

Also, when the usable time slot T1 is shortened, calculation unit 14e can show an expected value of consumed electrical energy on the screen of display unit 12, by using the frame W, like the above.

Thus, the present system calculates an expected value of consumed electrical energy by using actual consumed power of each electrical device K. Accordingly, estimation of consumed electrical energy can be achieved with high accuracy, when a new time slot has been set.

As explained above, the present system is provided with calculation unit 14e, and thereby a power manager can easily recognize an increase or a decrease of consumed electrical power to the present situation, when a new time slot has been set. Therefore, the present system can provide auxiliary information to the power manager upon follow-on development of a control schedule.

Then, in the above embodiment, a resource used by electrical devices was electricity. However, even if it is other resource, such as gas or water, the present system can produce a similar effect.

Although the present invention has been described with reference to certain preferred embodiments, numerous modifications and variations can be made by those skilled in the art without departing from the true spirit and scope of this invention, namely claims.

The invention claimed is:

1. An energy conservation diagnosis system, managing a device to be monitored, which consumes a resource to operate based on control schedule information,
   wherein the energy conservation diagnosis system comprises:
   an acquiring circuit acquiring operating information obtained by relating an operating condition of said device to be monitored to a clock time;
   a rule information generation circuit generating rule information by relating a rule on use of said device to be monitored to a clock time, based on one or more predetermined time slots depending on a benefit of the resource consumed by said device to be monitored;
   an operating determination circuit acquiring the control schedule information of said device to be monitored, said operating determination circuit generating an image data by superimposing the acquired control schedule information and the rule information onto the operating information so that each clock time is fitted to a clock time of the operating information; and
   a display displaying the image data.

2. The energy conservation diagnosis system as claimed in claim 1, wherein the rule information includes information that use of said device to be monitored is allowed in a predetermined time slot.

3. The energy conservation diagnosis system as claimed in claim 1, wherein the rule information includes information that deactivation of said device to be monitored is not allowed in a predetermined time slot.

4. The energy conservation diagnosis system as claimed in claim 1 further comprising a schedule development circuit developing the control schedule information, and a schedule determination circuit determining consistency between the developed control schedule information and the rule information,
   wherein said display is configured to show a determination result of said schedule determination circuit.

5. The energy conservation diagnosis system as claimed in claim 4, wherein said schedule determination circuit generates a message for prompting adjustment so that the control schedule information is consistent with the rule information, when determining that the developed control schedule information is not consistent with the rule information,
   wherein said display is configured to show the message generated by said schedule determination circuit.

6. The energy conservation diagnosis system as claimed in claim 1 further comprising a schedule determination circuit acquiring the control schedule information of said device to be monitored, said schedule determination circuit determining consistency between the acquired control schedule information and the rule information,
    wherein said display is configured to show a determination result of said schedule determination circuit.

7. The energy conservation diagnosis system as claimed in claim 1 further comprising a calculation circuit,
    wherein when ranges of the one or more time slots are modified and rules on use of the time slots after the modification are applied to said device to be monitored, said calculation circuit calculates amount of the resource consumed by said device to be monitored,
    wherein said display is configured to show a calculation result of said calculation circuit.

8. The energy conservation diagnosis system as claimed in claim 7, wherein said calculation circuit calculates electrical energy consumed by said device to be monitored, upon applying rules on use of the time slots after the modification to said device to be monitored, based on a rated electrical power of said device to be monitored.

9. The energy conservation diagnosis system as claimed in claim 7, wherein said acquiring circuit acquires operating information obtained by relating a consumed electrical power of said device to be monitored to a clock time,
    wherein said calculation circuit calculates electrical energy consumed by said device to be monitored, upon applying rules on use of the time slots after the modification to said device to be monitored, based on the consumed electrical power of said device to be monitored that is acquired by said acquiring circuit.

\* \* \* \* \*